Figure 1:
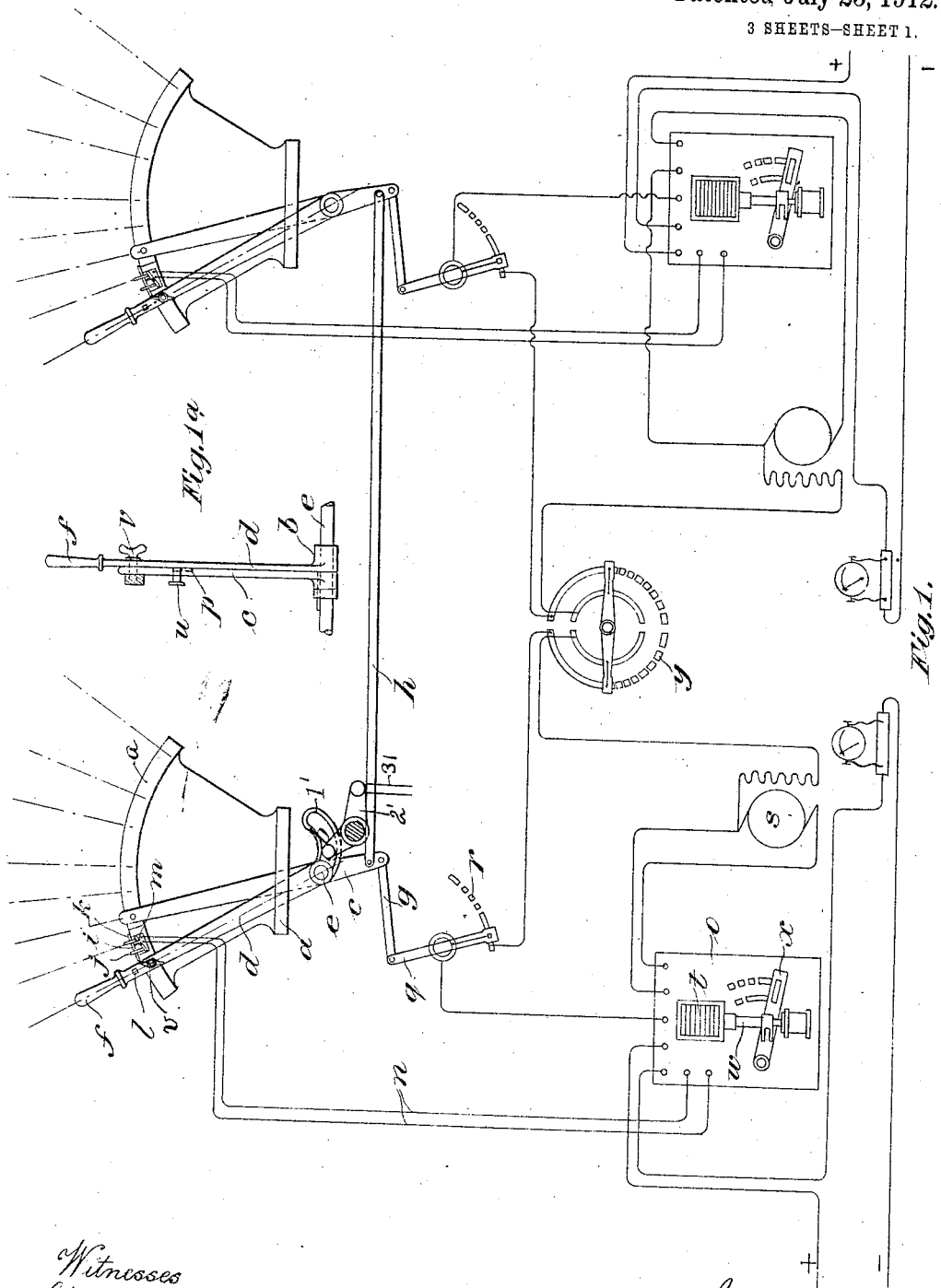

G. W. MASCORD.
APPLICATION AND DISTRIBUTION OF ELECTROMOTIVE POWER FOR USE IN STARTING MACHINERY, &c.
APPLICATION FILED JAN. 12, 1907. RENEWED DEC. 13, 1909.

1,033,257.

Patented July 23, 1912.

3 SHEETS—SHEET 1.

Witnesses
Stanley Wood.
Robert Owen Hughes.

Inventor
George W. Mascord
by
Spear, Middleton, Donaldson & Spear
Attorney.

G. W. MASCORD.
APPLICATION AND DISTRIBUTION OF ELECTROMOTIVE POWER FOR USE IN STARTING MACHINERY, &c.
APPLICATION FILED JAN. 12, 1907. RENEWED DEC. 13, 1909.

1,033,257.

Patented July 23, 1912.

3 SHEETS—SHEET 3.

UNITED STATES PATENT OFFICE.

GEORGE WILLIAM MASCORD, OF BARNES, LONDON, ENGLAND.

APPLICATION AND DISTRIBUTION OF ELECTROMOTIVE POWER FOR USE IN STARTING MACHINERY, &c.

1,033,257. Specification of Letters Patent. Patented July 23, 1912.

Application filed January 12, 1907, Serial No. 352,060. Renewed December 13, 1909. Serial No. 532,908.

*To all whom it may concern:*

Be it known that I, GEORGE WILLIAM MASCORD, a subject of the King of Great Britain and Ireland, residing at 5 The Crescent, Church Road, Barnes, London, S. W., England, engineer, have invented certain new and useful improvements in and relating to the application and distribution of electromotive power particularly for use in starting machinery and for such and similar purposes, of which the following is a specification.

This invention relates to the application and distribution of motive power particularly where electro-motors are employed as the source of motive power.

The invention has for its special object to provide means for starting and controlling the motor and the machine or mechanism driven by the motor at one or more points or by the operation of one or more operating levers, to provide means for conveniently putting a brake upon the driven mechanism or machine on the retraction of the operating lever and for simultaneously stopping the electro-motor, and generally to provide operating and controlling mechanism that permits of the effective and convenient control of the motor and machine from one or more points.

The invention also has for its object to provide for the utilization of two electro-motors with unit driving sets in such manner that both electro-motors may be operated simultaneously, or the unit sets disconnected so that each set may be operated independently at different speeds, or one operated while the other is at rest, such an arrangement being specially applicable to printing press plants.

According to the invention I provide clutch operating mechanism consisting of an operating lever provided with means for successively clutching the slow speed shaft and the main motor shaft. According to the invention I provide this operating lever to have the additional function of starting the motor, and for this purpose I provide upon the quadrant of the operating lever a starting switch, which, according to the invention, is preferably connected with a separate automatic motor starter, by which the current may be slowly switched on, for setting the motor into operation.

According to the invention moreover, I provide the main clutch which effects the direct connection for normal speed to operate also as a brake, this function of the clutch being realized on the retraction of the operating lever in the manner hereinafter more particularly described.

According to the invention also I provide the clutch operating lever, to have a movement rearward of its normal "stationary" position, and I provide the operating lever in two parts, one part being pivoted to the other upon a common pivotal center concentric with that of the quadrant base fitting, the handle portion being capable of being disconnected from the second portion and serving to operate a switch to stop or start the motor in the rearward movement that is permitted to it. The respective parts of the operating lever are however, according to the invention, provided with suitable means for their connection so that they may be simultaneously moved, and so that, in the retraction of the operating lever rearward of the normal "stationary" position, not only will the switch be operated for stopping the motor, but the clutch mechanism may be operated to act as a brake for the quick stopping of the machine, this latter operation being performed first in sequence and the stopping of the motor by the further rearward movement of the operating lever. It will be understood however, that by such an arrangement the part of the operating lever to which the clutch operating mechanism is connected may be arrested in its rearward movement at the "stationary" position when it is not desired to put on the brake, or where the main clutch is not provided to have this function.

According to the invention moreover, instead of providing the shunt contacts upon the quadrant base part, I provide the shunt contacts upon a separate quadrant or base, and I connect the separate contact lever or switch with the main clutch operating part of the operating lever provided as hereinbefore described.

According to the invention also I provide each unit set with a separate electro-motor, the motor shafts being advantageously in line with each other and connected together by shafting which is capable of being disconnected by a clutch, while the slow speed shaft of each set is also provided in line and is capable of being connected or disconnected as required according as to whether the respective unit sets are to be coupled together for simultaneous operation by each of the motors or be separately driven by each motor.

The invention is illustrated in the accompanying drawings, in which—

Figure 2:
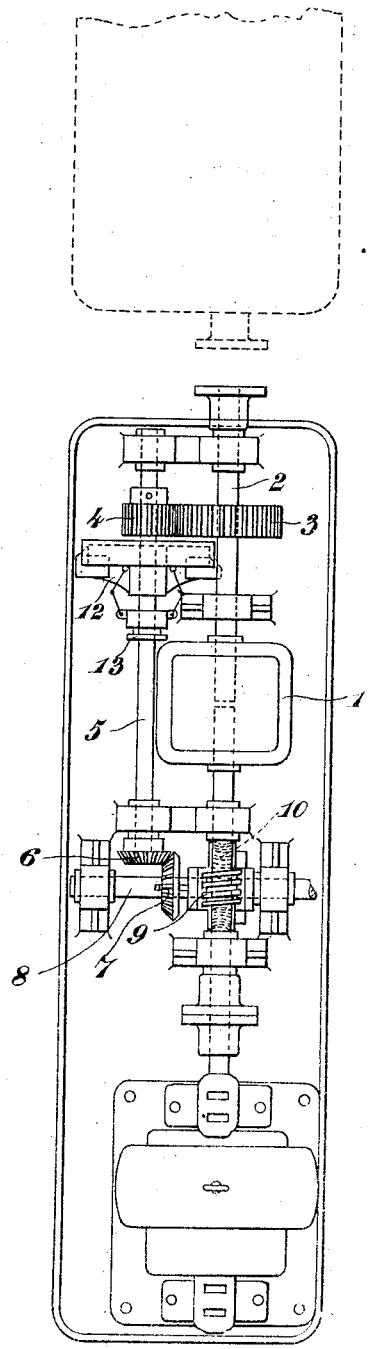
Figure 3:
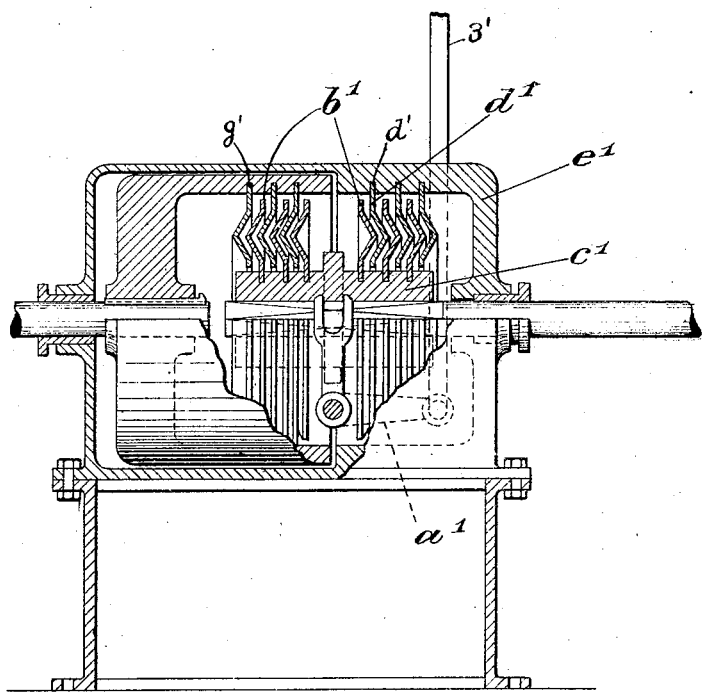

Figure 1 is a diagrammatic plan of a power installation provided according to the invention for operating two parts of a printing press, each of which is capable of use independently of the other. Fig. 1ª is a detailed view of the lever and its coöperating parts. Fig. 2 is a plan view of the mechanical parts of the installation. Fig. 3 is a sectional elevation of the brake mechanism employed.

In carrying the invention into effect, in the manner illustrated in the accompanying drawing I provide a quadrant base $a$ upon which the clutch operating lever is pivoted and this operating lever I provide in two parts $c$ $d$ which are pivoted upon the same center, the handle portion $d$ advantageously being loosely mounted upon a spindle $e$ while the second portion $c$ which is mounted adjacent to it, is keyed or fixedly mounted upon the said spindle. The first part $d$ is provided with a handle $f$ and the second part $c$ is connected to it, so that it may be moved by means of the first or handle part $d$ of the lever. The second portion $c$ of the lever it will thus be understood gives movement to the spindle $e$ to which is also connected a main clutch operating mechanism, and the link $h$ by which the second operating set, when such is provided, is connected. On the spindle $e$ is also mounted a guide piece $1'$ in which is guided one arm of a double armed lever $2'$, the other arm of the latter being connected to a lever $a'$ of the brake mechanism (Fig. 3) by means of a rod $3'$.

The first or handle part $d$ of the lever is provided as hereinbefore described to have a movement rearward of the "stationary" position assumed by the second or fixed portion $c$ of the lever, and upon the quadrant $a$ immediately behind this "stationary" position a motor starter $i$ is provided having two operating contacts $j$ $k$ which are disposed in the line of movement of an arm or contact piece $l$ provided upon the handle part $d$ of the lever. These contact pieces $j$ $k$ are advantageously connected to the opposite ends of a switch lever $m$ centrally pivoted so that on the movement of the handle portion $d$ of the lever from the extreme left hand position to the right, for example, the first contact $j$ which was depressed during the previous movement of retraction of the hand lever, is ridden over, while the next contact $k$ which is in its upper position is depressed so as to complete the solenoid circuit $n$ of an automatic starter $o$ by which the motor may be started.

After the handle portion $d$ of the lever has passed the motor starter it comes into position in alinement with the second or fixed portion $c$ of the lever with which it engages advantageously by means of a thumb screw $v$ upon one side or by means of a pin engaging with the edge of the lever which is the rear edge with reference to the forward movement to be given to it. On the further movement of the handle portion of the lever it will be understood that the slow motion shaft clutch is disconnected and the main clutch gradually put into engagement until a position is assumed by the lever corresponding to the full normal motor speed. On the further movement of the lever, resistances are put in circuit for the shunt control of the motor field. By such a movement of the operating lever, the motor $s$ is set in rotation and the machine is started. On the return movement of the operating lever the main shaft clutch is first disconnected and the (brake) clutch brought into such a position that it acts to a certain extent, and on the further return movement of the operating lever, the machine is brought to rest.

The clutch which acts as a brake is constructed in the following manner:—The shaft of the electro-motor $s$ is connected to one clutch half, in which are rigidly mounted a number of disks $g'$. Into the right hand side of the clutch casing $e'$ projects the end of the shaft of the printing press. On this shaft end is mounted a sleeve $c'$ which can be moved backward and forward thereon, and which rotates therewith, disks $b'$ being rigidly mounted on the sleeve $c'$. In the casing are rigidly mounted a number of disks $d'$. By moving the lever portion $c$, the disks $b'$ are brought into engagement either with the disks $d'$ or the disks $g'$ thus coupling the press shaft with the motor shaft or braking the press shaft.

The part $c$ of the operating lever can be held in a stationary position either by the pin $u$ (Fig. 1ª) which is acted upon by a spring and drawn back by hand, said pin on the return movement of the operating lever, automatically projecting into a hole in the segmental base $a$. The portion $c$ of the operating lever is extended beyond the spindle $e$ and is connected by means of a link $q$ to a shunt control lever $q$ so that in the movement of the operating lever forward from the position corresponding to the full normal motor speed the shunt control lever $q$ will contact with the shunt control contacts $r$ whereby resistances are put into circuit for the reduction of the motor field to an extent determined according to the movement of the operating lever which is limited in its movement at the position corresponding to full speed.

I prefer to provide a so called automatic starter by which the motor may be slowly put into operation, such starter conveniently consisting of a solenoid $t$ whose coils are in the circuit of the starting device before mentioned, the core $w$ of the solenoid being connected to a switch lever $x$ and having its movement retarded by any suitable means. It will however be understood that any other kind of motor starter may be provided.

In carrying the invention into effect when providing two unit sets for the independent or simultaneous operation of two parts of a machine or two adjacent machines, then two separate electro-motors are provided. I employ separate unit sets of the motor and clutch controlling mechanism which is substantially the same as hereinbefore described, the clutch operating portions of the operating levers of each set being conveniently connected together advantageously by means of a link $h$ so that when connected, both parts of the machine may be operated from one or the other operating lever of the respective sets, and I provide a balancing rheostat $y$ in the circuit of one or the other or both of the motor fields by which any desired compensation may be given according to the reading of the respective ammeters.

The necessary connections and all the controlling apparatus are advantageously mounted in close proximity one to the other.

The balancing rheostat upon one side, it will be understood, is in the circuit of one motor field and on the other in the circuit of the other motor field and the respective resistance coils are inserted in the circuit before the rheostat. The rheostat may be of any suitable construction.

In carrying the invention into effect as far as concerns motors and mechanical gear as illustrated in Fig. 2, I provide the motor shaft of each unit set connected with the driven shaft by means of the main friction clutch 1 illustrated in detail in Fig. 3, and the respective driven shafts 2. 2. of each set are preferably provided in alinement with each other and connected together by means of a dog clutch, so that the driven shafts may either be connected together or disconnected as required.

A gear wheel 3 is provided on each of the driven shafts 2. 2. gearing with the respective gear wheels 4 mounted upon counter-shafts 5 from which motion is communicated to the respective machine parts or to the machine to be operated.

A bevel wheel 6 is mounted on each of the counter-shafts for gearing within the bevel wheel 7 mounted upon a transversely disposed counter-shaft 8 upon each of which latter is mounted a worm 10 gearing with a worm wheel 9 mounted upon the respective (counter) shafts. The slow speed shafts 5 for each unit plant may be connected together by means of a dog clutch so that the respective slow speed shafts may be disconnected when required. A gear wheel 4 is mounted upon the slow speed shafts, and a second clutch 12 is also mounted upon the same shaft, which clutch is advantageously of the jaw-gripping type in which the engaged part is formed integral with the gear wheel 4 aforesaid, which latter is freely mounted upon the respective slow speed shafts and may be set in position against a collar 13.

The jaw gripping clutch 12 may be operated by a tripping device by which it is released when the operating hand lever is moved forward after starting in order to increase the speed of the press to the normal.

The operation and use of the driving gear as immediately before described is substantially the same as that described in the specification of the prior British Patent No. 727 of 1904, the only differences being that separate motors and separate sets of gearing are provided, that the motor or driving shaft as well as the slow speed shaft, is provided with means of connection or disconnection for the purpose hereinbefore described, and that means are provided controlled by the clutch operating lever for braking the driven shaft.

The operation of the apparatus is the following:—For starting, the operating lever is moved from its extreme left-hand position to the right thus bringing the piece $l$ over the contact $k$ so that the switch $m$ for the automatic starter $o$ is closed and the motor commences to rotate. When on further movement of the lever portion $d$ this latter comes over the lever portion $c$ the latter is by means of the screw connection moved with the lever portion $d$, after the pin $u$ has been withdrawn from the hole in the base plate $a$. On the further movement of the operating lever from the stationary position to the extreme right-hand position, the brake disks $d'$ and $b'$ are brought out of engagement, then the clutch disks $b'$ and $g'$ are brought into engagement and the working machine is gradually brought to its highest speed. Sufficient play remains on the right for the operating lever to permit of regulation through the shunt control resistance contacts. In the return movement of the operating lever $f$, $d$ from its right-hand position to the left, it takes with it the lever portion $c$ which is coupled thereto by means of the screw $v$. During the return movement of the lever to the stationary position, in which position the spring influenced pin $u$ projects into the hole in the segmental base $a$, the disks $g'$ $b'$ are gradually brought out of engagement and the disks $b'$, $d'$ gradually into engagement so that the printing press is gradually brought to a standstill while the motor continues to rotate. The connection between the two lever portions is now released by hand and the electro-motor is brought to rest by opening the switch by means of the piece $l$ of the lever portion $d$ depressing the contact $j$ on the further movement to the left of the said lever portion $d$.

What I claim as my invention and desire to secure by Letters Patent, is:—

1. The combination with a driven member and a motor for operating the same, clutch mechanism, a cam lever for operating the same, an automatic motor starter, a switch controlling the same whereby the current may be slowly switched on for starting the motor into operation, said switch being actuated by the operating lever.

2. The combination with a motor, a switch controlling the same, resistances controlling the motor field, a driven element, clutch mechanism connected therewith, and an operating lever comprising two parts, one part operating the switch and clutch mechanism while the other part operates the resistance of the motor field.

3. The combination with a driven element and a motor for operating the same, clutch mechanism, resistances controlling the motor field, an automatic motor starter, a switch controlling the same, and an operating lever comprising two parts, one part operating the clutch mechanism and the switch while the other part controls the resistances for the motor field.

4. In combination with a driven element and a motor for operating the same, of clutch mechanism, means for starting the motor, means for controlling the motor field and an operating lever comprising two parts, one part operating the clutch mechanism and the means for starting the motor while the other part operates the means for controlling the motor field.

In testimony whereof I have hereunto signed my name to this specification in the presence of two subscribing witnesses.

GEORGE WILLIAM MASCORD.

Witnesses:
 FREDERICK COLLINS,
 H. D. JAMESON.

Copies of this patent may be obtained for five cents each, by addressing the "Commissioner of Patents, Washington, D. C."